US012670104B2

(12) United States Patent          (10) Patent No.:     US 12,670,104 B2

Gregory                               (45) Date of Patent:      Jun. 30, 2026

(54) DEDUPLICATION OF REFRESH ENTRIES IN A MULTI-CONSUMER VERSIONING SYSTEM

(71) Applicant: Hewlett Packard Enterprise Development LP, Spring, TX (US)

(72) Inventor: James Gregory, Bristol (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 55 days.

(21) Appl. No.: 18/986,123

(22) Filed: Dec. 18, 2024

(65) Prior Publication Data

US 2026/0169924 A1      Jun. 18, 2026

(51) Int. Cl.
*G06F 12/0891*          (2016.01)

(52) U.S. Cl.
CPC ................................. *G06F 12/0891* (2013.01)

(58) Field of Classification Search
CPC ..................................................... G06F 12/0891
See application file for complete search history.

(56) References Cited

U.S. PATENT DOCUMENTS

| | | | | |
|---|---|---|---|---|
| 11,249,914 B2 * | 2/2022 | Wang | .................. | G06F 12/0868 |
| 11,269,644 B1 * | 3/2022 | Carlson | .............. | G06F 9/30101 |
| 2025/0156432 A1 * | 5/2025 | Gregory | ............ | G06F 16/24552 |

OTHER PUBLICATIONS

U.S. Appl. No. 18/505,829, Title: Multi-Consumer Versioning System for Retrieving Lists of Changed Objects, filed Nov. 9, 2023.
U.S. Appl. No. 18/505,829, filed Nov. 9, 2023, James Gregory.

* cited by examiner

*Primary Examiner* — Zhuo H Li
(74) *Attorney, Agent, or Firm* — Fletcher Yoder, P.C.

(57)          ABSTRACT

Techniques are provided for reducing the amount of information to be transmitted to a user about resources of a cloud infrastructure, while allowing the information available to the user to remain current relative to the state of the resources in the cloud infrastructure. A cache ring is generated for a resource type, and the cache ring comprises a plurality of entries corresponding to objects associated with a resource/resources of the resource type in the cloud infrastructure. The plurality of entries includes a set of entries corresponding to a full refresh having a start index and an end index of the cache ring. When a subscription request is received from a user interface, a partial refresh is performed for the user interface based on the full refresh if certain conditions are satisfied, otherwise, another full refresh is performed for the user interface.

20 Claims, 5 Drawing Sheets

250

252
GENERATE A CACHE RING CORRESPONDING TO A RESOURCE TYPE

254
PERFORM A FIRST FULL REFRESH FOR A FIRST SUBSCRIPTION REQUEST

256
RECEIVE A SECOND SUBSCRIPTION REQUEST, WHERE THE CACHE RING DOES NOT COMPRISE A VERSION NUMBER ASSOCIATED WITH THE SECOND SUBSCRIPTION REQUEST

258
WHEN A CURRENT INDEX OF THE CACHE RING SATISFIES A CONDITION, PERFORM A PARTIAL REFRESH BASED ON THE FIRST FULL REFRESH

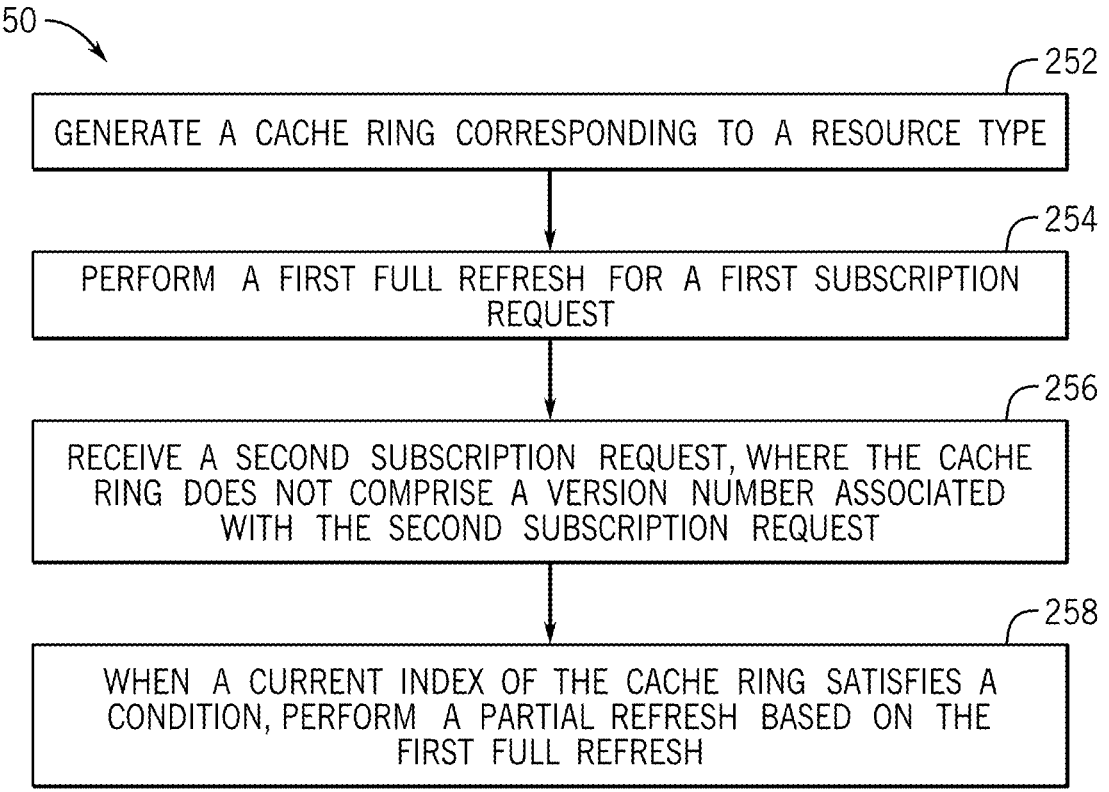

250

252
GENERATE A CACHE RING CORRESPONDING TO A RESOURCE TYPE

254
PERFORM A FIRST FULL REFRESH FOR A FIRST SUBSCRIPTION REQUEST

256
RECEIVE A SECOND SUBSCRIPTION REQUEST, WHERE THE CACHE RING DOES NOT COMPRISE A VERSION NUMBER ASSOCIATED WITH THE SECOND SUBSCRIPTION REQUEST

258
WHEN A CURRENT INDEX OF THE CACHE RING SATISFIES A CONDITION, PERFORM A PARTIAL REFRESH BASED ON THE FIRST FULL REFRESH

FIG. 3

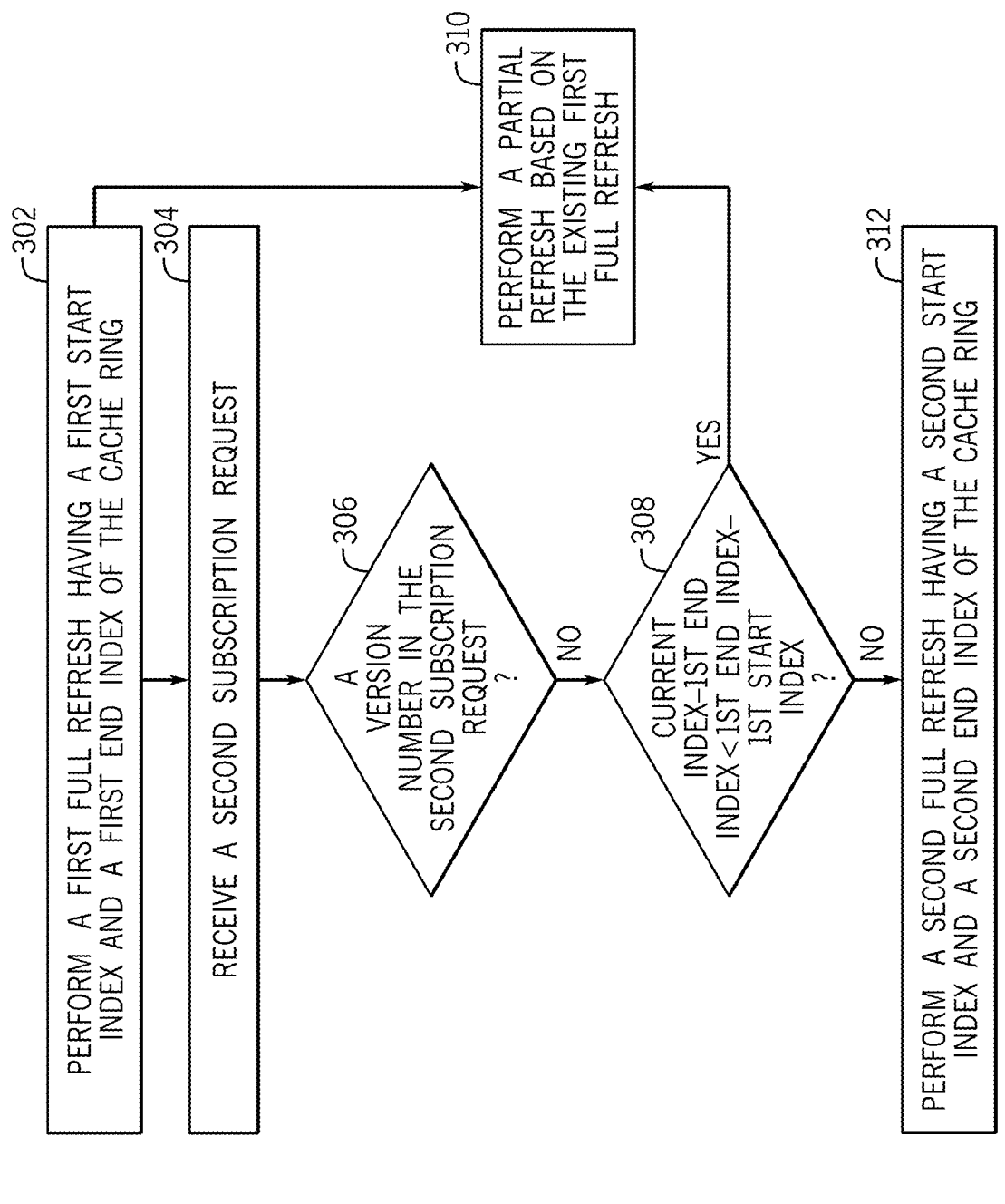

300

302 — PERFORM A FIRST FULL REFRESH HAVING A FIRST START INDEX AND A FIRST END INDEX OF THE CACHE RING

304 — RECEIVE A SECOND SUBSCRIPTION REQUEST

306 — A VERSION NUMBER IN THE SECOND SUBSCRIPTION REQUEST ?

NO

308 — CURRENT INDEX-1ST END INDEX<1ST END INDEX- 1ST START INDEX ?

YES

310 — PERFORM A PARTIAL REFRESH BASED ON THE EXISTING FIRST FULL REFRESH

NO

312 — PERFORM A SECOND FULL REFRESH HAVING A SECOND START INDEX AND A SECOND END INDEX OF THE CACHE RING

FIG. 4

DEDUPLICATION OF REFRESH ENTRIES IN A MULTI-CONSUMER VERSIONING SYSTEM

BACKGROUND

Users of computing resources often desire to view information related to such resources. As an example, users may access a user interface to view information about the resources. However, users may disconnect from such a user interface from time to time for various reasons. When the disconnection time is long enough, information regarding the resources may change. However, it may be inefficient to re-provide all resource-related information each time a user interface re-connects to an entity capable of providing resource-related information.

BRIEF DESCRIPTION OF THE DRAWINGS

Features, aspects, and advantages of the present disclosure will become better understood when the following detailed description is read with reference to the accompanying drawings in which like characters represent like parts throughout the drawings, wherein:

FIG. 3 illustrates an overview of an example method for performing a partial refresh when a current index of a cache ring satisfies a condition, in accordance with aspects of the present disclosure;

FIG. 4 illustrates an example method for performing a partial refresh when a current index of a cache ring satisfies a condition, in accordance with aspects of the present disclosure;

DETAILED DESCRIPTION

Figure 1:
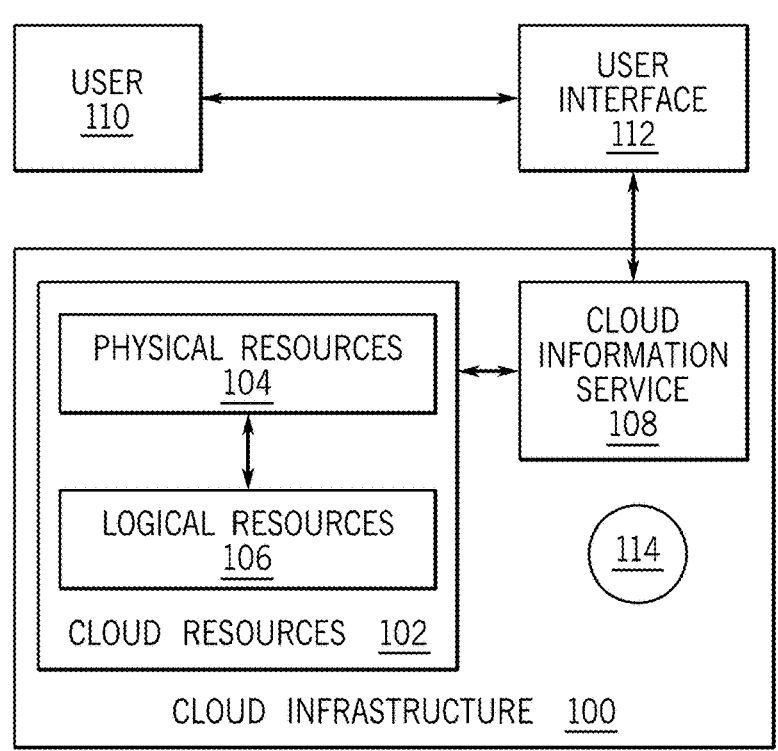
FIG. 1 illustrates a block diagram of an example system for providing cloud infrastructure information to any number of users, in accordance with aspects of the present disclosure.

One or more specific aspects of the present disclosure will be described below. In an effort to provide a concise description of these aspects, all features of an actual implementation may not be described in the specification. It should be appreciated that in the development of any such actual implementation, as in any engineering or design project, numerous implementation-specific decisions are made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various aspects of the present disclosure, the articles "a," "an," "the," and "said" are intended to mean that there are one or more of the elements. The terms "comprising," "including," and "having" are intended to be inclusive and mean that there may be additional elements other than the listed elements.

A variety of computing resources (e.g., any physical resources and/or logical resources) may exist in a cloud infrastructure. Examples of such resources include, but are not limited to, servers, network devices, enclosures (e.g., server racks, blade enclosures, etc.), clusters, pods, containers, microservices, virtual machines, buckets (e.g., collections of stored data), etc. that correspond to one or more users of the resources. A given user may access a user interface (e.g., a Data Services Cloud Console) in which the user may view information about the various resources (e.g., the aforementioned physical resources and/or logical resources) in a cloud infrastructure. Any number of users using any number of user interfaces may desire to view information about resources in a particular cloud infrastructure.

However, the amount of information about the resources that a particular user desires to view may be large. As an example, there may be hundreds, thousands, millions, etc. of resources in a particular cloud infrastructure. Thus, each time a user accesses a user interface, either for a first time or any subsequent time after disconnecting from a previous session (e.g., intentionally, as a result of a connectivity interruption, etc.), all of the information about all of the resources relevant to the user accessing the user interface may be retrieved and provided to the user interface to be displayed to the user. However, transmitting large amounts of information about resources in a cloud infrastructure each time a user connects or reconnects to a cloud information service may be costly, in terms of compute resources, memory resources, network resources, time to transmit, expense, etc. Accordingly, it is desired to reduce the amounts of information about resources in a cloud infrastructure each time a user connects or reconnects to a cloud information service.

The current disclosure provides techniques for reducing the amount of information about the resources transmitted to a user, while allowing the information available to the user to remain current relative to the state of the resources of the cloud infrastructure. The techniques use cache rings to provide information to a user interface about any number of resource types in a cloud infrastructure. The techniques allow the cloud information service to only provide information about objects that have been created, updated, or deleted, and only performing a full refresh of all information when a certain condition is satisfied so that the cloud information service does not fill a cache ring with multiple sets of entries representing the same underlying objects. With this approach, the initial size of the cache rings may be reduced, and the system may support increased numbers of consumers and increased disconnection time.

When the user initiates (e.g., opens, executes, connects to, etc.) a user interface for viewing information about resources in a cloud infrastructure for the first time, a subscription request may be sent to a cloud information service that is operatively connected to the cloud infrastructure in which the resources exist. Such subscription requests may also occur each time the user interface reconnects to the service (e.g., after a disconnect). A user interface may remain subscribed after a subscription request as long as the user interface remains connected to the cloud information service. As an example, the cloud information service may be implemented on a Kubernetes pod executing in the cloud infrastructure. In response to the subscription request, the cloud information service may access information about the various resources, provide the information to the user in response to the subscription request, and provide updates for as long as the user interface maintains the connection, and, thus, remains subscribed.

Each of the resources in a cloud infrastructure corresponds to a data object that includes information about the resource. As an example, an enclosure may have a firmware version, a certain number of components installed that are each in certain state (e.g., on, off, connected to or disconnected from a network, in a degraded state, etc.), and/or any other relevant information related to the enclosure, etc., and the collection of such information about the enclosure may be considered an object. As another example, an application may be deployed in a Kubernetes container platform as a set of microservices implemented on a number of container pods, and all of the information about that application, or any portion thereof (e.g., the container platform, the microservices, pods, containers, devices on which such things are deployed, etc.), may be considered an object. As another example, a user may have created any number of buckets (e.g., Amazon S3 buckets) for storing information of any type, and information about each of the buckets (e.g., bucket size, space left in bucket, access policy for bucket, etc.) may be considered as objects. Thus, as used herein, an object may refer to metadata about a resource (e.g., an enclosure, a container deployment, a bucket, any physical or logical component, etc.) in a cloud infrastructure. Objects may be grouped into resource types. For example, an enclosure resource type may refer to all objects corresponding to enclosures, a container resource type may refer to a collection of objects corresponding to container deployments, a bucket resource type may refer to a collection of objects corresponding to buckets, etc.

A cloud information service may be configured to create and maintain a cache ring for each resource type in a cloud infrastructure. There may be any number of cache rings, depending on how many resource types exist in the cloud infrastructure. The following description, for the sake of clarity, will focus on one cache ring for one resource type. However, one of ordinary skill in the art will appreciate that the description of a cache ring applies to any number of cache rings for any number of resource types in a cloud infrastructure, and that a cloud information service may use the various cache rings to provide information to a user interface about any number of resource types.

The cache ring may be implemented in memory, such as a non-persistent storage. The cache ring may have entries that are added by the cloud information service as they are received by the cloud information service, with each entry corresponding to a respective index that is increased from the previous entry (e.g., by one). The cloud information service may be provided information each time an object corresponding to a resource in the cloud infrastructure is updated. As an example, when the firmware of an enclosure is updated, the object corresponding to the enclosure may be updated to reflect the new firmware version. As another example, when access permissions for a bucket are updated, the object corresponding to the bucket may be updated to reflect the new access policy. As another example, when the number of pods of containers used to implement an application increases, the object corresponding to the container deployment may be updated with the new number of pods. Other updates to the resources may cause updates to corresponding objects without departing from the scope of examples disclosed herein. The cloud information service may receive information about object updates using any manner of receiving information. As an example, the cloud information service may receive information about container deployments via a Kubernetes application programming interface (API) providing information based on a custom resource definition (CRD). As another example, various APIs may exist and be configured to provide information about other resources (e.g., buckets, physical devices, logical components, etc.).

Each time the cloud information service is notified that an object has been updated, the cloud information service may add an entry to a cache ring corresponding to a resource type to which the updated object belongs. Each such update to an object of the resource type to which the cache ring corresponds causes the cloud information service to add an entry to the cache ring, up to the configured maximum size of the cache ring (e.g., hundreds, thousands, millions, etc. of entries). Each entry added to a cache ring by the cloud information service includes a unique identifier (e.g., a unique name, a universally unique identifier (UUID), etc.) of the object that was updated, and a version data item. The version data item may include an encoding of the type of entry (discussed below), as well as a representation of the version number for the entry. As an example, the version data item may be a thirty-two-bit number, in which the first two bits are used to encode one of four possible entry types, and the remaining thirty bits are used to encode the integer value of the version number. Each entry added by the cloud information service to a cache ring may include a version number that is increased (e.g., by one) from the previous entry added to the cache ring.

As discussed above, a cache ring corresponds to a resource type, and there may be any number of objects of that resource type (e.g., millions of buckets, each corresponding to separate objects). An update to any object of that resource type causes the cloud information service to add an entry to the appropriate cache ring for the resource type. However, the version number represents a new entry in the cache ring and does not correspond to any particular object of the resource type. As an example, an update to a first object of a particular resource type may cause the cloud information service to add a first entry to the cache ring with an identifier of the first object and a version data item that includes two bits to represent the update type and the remaining bits to represent version one. The cloud information service may then be notified of an update to a second object of the same resource type. In response, the cloud information service may add a second entry to the cache ring with an identifier of the second object and a version data item that encodes the update type and includes a representation of version two. Thus, even though the objects were not the same object, the version number increased as the second entry was added to the cache ring by the cloud information service, so that the second entry has a higher version number than the first entry.

There are four types of entries. The first type of entry is an update. An update is when the information in an object (e.g., metadata corresponding to a resource in a cloud infrastructure) changes. As an example, when the firmware of a network component of an enclosure changes, the object may be changed to reflect a version number of the new firmware. The second type of entry is a deletion. As an example, a resource may be removed from the cloud infrastructure (e.g., a physical device is removed, a container pod is deleted, a bucket is deleted, etc.), and the object corresponding to that resource is deleted. The third type is a create. As an example, a new object may be created for the resource. The fourth type of entry is a refresh. A refresh is an entry type used whenever a full refresh is performed. A full refresh is performed whenever a subscription request is received and satisfies a condition (discussed further below). A full refresh requires all objects of a resource type corresponding to a cache ring to be provided to the user interface from which the subscription request was received. A subscription request is received whenever the user interface is accessed by the user so that the user may view information about resources of a cloud infrastructure. As such, a subscription request may be received when a user first uses the user interface and connects to a cloud information service, and also each time a user reconnects to the cloud information service after previously disconnecting from the cloud information service.

An initial subscription request may not include a version number. If a subscription request is received and has no version number, a full refresh may be performed when a condition is satisfied, as described in detail herein. To perform a full refresh, the cloud information service creates a list of all objects of the resource type to which the cache ring corresponds. The list of all objects is a list of objects corresponding to a resource currently present in the cloud infrastructure (e.g., the list does not include objects corresponding to those resources that were deleted before that full refresh was started). The cloud information service adds entries to the cache ring corresponding to the list of all objects of the full refresh, and the entries occupy the cache ring from a start index to an end index. For example, the first object on the list may occupy the cache ring with the start index, while the last object on the list may occupy the cache ring with the end index.

The cloud information service may check to determine whether any updates to any objects have occurred during the time the object list was being created and the refresh entries were being added to the cache ring. However, in some situations, the amount of time for performing a full refresh may be small, and, thus, the cloud information service may not check for updates that occur during an uninterrupted full refresh. Instead, updates that occur during an uninterrupted full refresh may be processed after completion of the full refresh. If no updates occurred during the time the object list was being created and the refresh entries were being added to the cache ring, or in situations in which updates are not checked during uninterrupted full refreshes, the cloud information service may send information corresponding to each refresh entry to the user interface in one or more messages of any type (e.g., data packets over a network). The information corresponding to a refresh entry is the metadata about the resource to which an object corresponds. The cloud information service may use the unique identifiers (which are included in the entries in the cache ring) of the objects to obtain the information from the objects using whatever method of obtaining such information is appropriate for the resource type (e.g., Kubernetes API for objects corresponding to a container deployment, other APIs for objects corresponding to physical resources, etc.). The information from the objects is sent via one or more messages and used to update the user interface to display the information to the user.

If any updates to objects were added to the cache ring after the last entry (e.g., the end index) of the full refresh, but before the full refresh is complete (e.g., before the information corresponding to each refresh entry is sent to the user interface), the cloud information service updates the list of objects to reflect the change to whatever the new version number of the one or more objects that were updated so that the cloud information service is aware of the newest version number in the cache ring corresponding to objects being sent to the user interface as part of the full refresh. The newest version of the object is always sent to the user interface, as the cloud information service may not maintain any history of the state of the object after an object is updated.

If a subsequent subscription request is received (e.g., from another (e.g. second) user using another (e.g. second) user interface) before the full refresh is complete (e.g., before the information corresponding to each refresh entry is sent to the user interface), the cloud information service may start another (e.g. second) full refresh in response to the subsequent subscription request when a condition is satisfied. For example, if the number of entries added to the cache ring after the last entry of the full refresh equals to or exceeds the total number of entries in the full refresh, a subsequent full refresh may be performed for the subsequent subscription request. The cloud information service creates another (e.g., a second) list of objects corresponding to resources currently present in the cloud infrastructure (e.g., based on the entries added to the cache ring after the last entry of the full refresh). The cloud information service adds entries to the cache ring corresponding to the second list of objects of the subsequent full refresh, and the entries occupy the cache ring from another (e.g., second) start index to another (e.g., second) end index.

Figure 2:
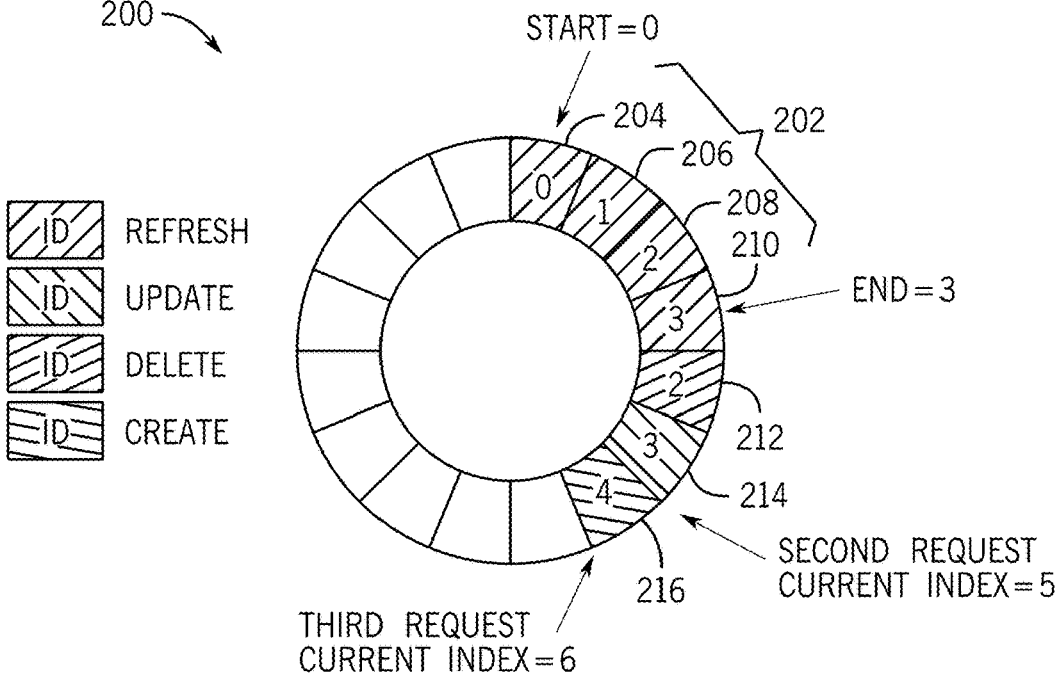
FIG. 2 illustrates an example cache ring for providing information about cloud resources to user interfaces, in accordance with aspects of the present disclosure.

If the number of entries added to the cache ring after the last entry of the full refresh is less than the total number of entries in the full refresh, a partial refresh, instead of another full refresh, may be performed for the subsequent subscription request. During the partial refresh, the cloud information service may utilize the existing entries in the last full refresh (e.g., latest or the most recent refresh) together with the updates to objects added to the cache ring after the last entry (e.g., the end index) of the last full refresh to create the second list of objects that may be sent to the second user interface. The cloud information service creates the second list of objects to reflect the change to whatever the new version number of the objects that were updated so that the newest versions of the objects are always sent to the user interface. The cloud information service may then send information corresponding to the second list of objects to the second user interface in one or more messages of any type (e.g., data packets over a network). During the partial refresh, the cloud information service does not add entries to the cache ring corresponding to the second list of objects. Accordingly, the cloud information service does not fill the cache ring with multiple sets of entries representing the same underlying objects, as illustrated in FIG. 2. Accordingly, the current techniques prevent duplicating refresh entries for the same objects unless there has been significant change to the underlying object set since the last refresh. With this approach, the initial size of the cache rings may be reduced, and the system may support increased number of consumers and an increased disconnection time.

If a disconnect occurs during a full refresh, when the user interface reconnects, a new subscription request may be received, the new subscription request may include a version number which is the newest version number that the user interface received during the attempted full refresh. In the above case, the cloud information service may resume the full refresh by starting with the next version number after the version number received in the new subscription request. The full refresh is complete when all object information for all objects of the resource type to which the cache ring corresponds, including any updates that occurred before the full refresh completes, are sent to the user interface, along with the highest version number in the cache ring of any entry for any object that was sent as part of the full refresh. Additionally, or alternatively, during a full refresh, object information may be sent in a series of messages, with object information from any number of objects in each message. In such situations, the highest version number of an object sent in a message may be sent to the user interface for each message, even if higher version numbers exist in the cache ring.

After the initial full refresh, if the user remains connected, the subscription is active, and the cloud information service may send any updates to objects that occur (each of which causes a new entry to be added to the cache ring), skipping any entries added to the cache ring as part of another full refresh for another user using another user interface. For example, the cloud information service may identify and skip the refresh type of entries of another full refresh for another user using another user interface based on the end index of the full refresh, or by identifying one or more other type of entries (e.g., update, delete, create) in between the last refresh entry of the full refresh and the first refresh entry of the second full refresh for another user. New entries that are not refresh type entries (which are skipped when providing updates to an active subscription) may be update type entries, create type of entries, or delete type entries. As discussed above, for any update type of entry or create type of entry, the cloud information service may obtain the object information and send the object information to the user interface. For any delete type of entry, the cloud information service sends a notification to the user interface that the object was deleted. The user interface may update the information for the user in response to any update received from the cloud information service, and modify the information shown in the user interface to reflect any deletions of which the user interface is notified by the cloud information service.

A user interface may disconnect from the cloud information service for any reason. As an example, the disconnect may be intentional (e.g., the user closes the user interface) or may result from a disruption of the connection between the user interface and the cloud information service (e.g., a network outage). If a user has previously connected to the cloud information service, a subscription request received as part of a reconnect may include the version number that was the highest version number present in the cache ring the last time the user was connected. As an example, if the user interface initially connected, and a full refresh was completed, then the version number may be the highest version number received as part of the full refresh, or of any updates received after the full refresh while the user remained connected to the cloud information service. If a subscription request includes a version number (e.g., for any reconnect after an initial connection), the cloud information service may use the version number to perform a binary search to determine if the version number received in the subscription request is still in the cache ring. The fact that the version of entries added to the cache ring by the cloud information service always increases allows the cloud information service to perform the binary search.

A binary search is performed by starting with the middle entry in the cache ring. If the version number received in subscription request is equal to the version number of the entry in the middle of the cache ring, then the cloud information service makes a list of all object changes corresponding to entries having a higher version number, which may be entries in the half of the cache ring that have a higher version number than the middle entry, except for the refresh entries that may be in the cache ring for a full refresh being performed for another user (which are skipped by the cloud information service). If the version number received in the subscription request is not equal to the version number of the middle entry of the cache ring, the half of the cache in which the version number cannot exist is eliminated from the search, and the search is repeated using the middle element of the half of the cache ring that remains. The binary search continues until an entry having a version number equal to the version number received in the subscription request is found by the cloud information service, or until the cloud information service determines that the version number is no longer in the cache ring. As an example, the cache ring is structured as a ring. Thus, when the number of entries in the cache ring reaches the configured maximum number of entries, the cloud information service returns to the start of the cache ring to add new entries. Therefore, if the period of disconnection was long enough, the version number received in a subscription request may not exist in the cache ring, as it may have been overwritten by newer entries to the cache ring.

If the version number received in the subscription request is found via the binary search, the cloud information service may provide updated object information or notifications of objects deletions for all entries in the cache ring having a higher version number than the version number received in the subscription request, except for entries that may be in the cache ring for a full refresh being performed for another user (which are skipped by the cloud information service). If the version number received in the subscription request is not found via the binary search, then the cloud information service performs a full refresh or a partial refresh, as described above, and information for all objects is sent to the user interface from which the subscription request was received.

The cloud information service may use the cache ring, generated as described above, to service existing subscriptions. Any number of users, using any number of user interfaces, may connect to the cloud information service to receive updates about various physical and logical resources of a cloud infrastructure. Such subscriptions may remain active so long as the user interface remains connected to the cloud information service. As discussed above, whenever the cloud information service becomes aware that an update has been made to an object corresponding to a resource of a resource type of a cache ring, the cloud information service updates the cache ring by adding a new entry with an incremented version number, an update type, and a unique name of the object. The cloud information service then determines whether any active subscriptions exist that should receive information from the cache ring. If there are such active subscriptions, the cloud information service may fetch object information for the object that was updated, and send the updated object information to all active subscribers that are to receive updates for the resource type of the cache ring.

This disclosure may allow any number of user interfaces to receive and maintain current information about resources in a cloud infrastructure without having to be sent all information about the resources each time the user interface connects to a cloud information service seeking the resource information via a subscription request. The amount of information being transmitted to the user interface from the cloud information service is reduced by maintaining a cache ring for each resource type in the cloud infrastructure. The entries in the cache ring include an object identifier, an entry type, and a version number. The cloud information service may use the entries in the cache ring to provide information about objects and only perform a full refresh of all information when a certain condition is satisfied so that the cloud information service does not fill the cache ring with multiple sets of entries representing the same underlying objects.

FIG. 1 illustrates a block diagram of an example system for providing cloud infrastructure information to any number of users. As shown in FIG. 1, the system may include a cloud infrastructure 100. The cloud infrastructure 100 may include cloud resources 102 and a cloud information service 108. The cloud resources may include physical resources 104 and logical resources 106. The system may also include a user 110 and a user interface 112. Each of these components is described below.

The cloud infrastructure 100 may be a collection of any number of computing devices and other components in which a cloud computing environment is deployed, and which may host any number of cloud-based applications, as-a-Service (aaS) products (e.g., Software aaS (SaaS), Infrastructure aaS (IaaS), Platform aaS (PaaS), Storage aaS (STaaS), etc.), microservices, container platforms, virtualization environments, infrastructure components, power supplies, racks, enclosures, environment controls, physical spaces, wiring, etc. The cloud infrastructure 100 may include one or more private clouds, public clouds, and/or hybrid clouds. The cloud infrastructure 100 may be located in a single physical location and/or environment or may be spread among any number of separate locations and/or environments. The cloud infrastructure 100 may be owned or otherwise maintained by a particular entity or be provided by any number of separate entities.

The cloud infrastructure 100 may include the cloud resources 102. The cloud resources, as used herein, refer to the portion of the cloud infrastructure 100 that may be used or otherwise accessed by any number of users (e.g., the user 110) of the cloud infrastructure 100. As an example, the cloud resources 102 may include the portion of the cloud infrastructure 100 that are used by users to access aaS offerings, composable infrastructure, virtualization environments, microservices, storage and backup services, database management, etc.

The cloud resources 102 may include the physical resources 104. The physical resources 104 may include any physical (e.g., hardware) components of the cloud resources, such as, for example, computing devices, network components, storage components, racks, enclosures, etc.

As used herein, a computing device (not shown) may be any single computing device, a set of computing devices, a portion of one or more computing devices, or any other physical or logical grouping of computing resources. A computing device may be any device, portion of a device, or any set of devices capable of electronically processing instructions and may include, but may be not limited to, any of the following: one or more processors (e.g. components that include circuitry), memory (e.g., random access memory (RAM)), input and output device(s), non-volatile storage hardware (e.g., solid-state drives (SSDs), persistent memory (Pmem) devices, hard disk drives (HDDs)), one or more physical interfaces (e.g., network ports, storage ports), any number of other hardware components (not shown), and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer, automobile computing system, and/or any other mobile computing device), a storage device (e.g., a disk drive array, a fibre channel storage device, an Internet Small Computer Systems Interface (ISCSI) storage device, a tape storage device, a flash storage array, a network attached storage device, etc.), a network device (e.g., switch, router, multi-layer switch, etc.), an Internet of Things (IoT) device, an array of nodes of computing resources, a supercomputing device, a data center or any portion thereof, and/or any other type of computing device with the aforementioned requirements. Any or all the aforementioned examples may be combined to create a system of such devices, or may be partitioned into separate logical devices, which may collectively be referred to as a computing device. Other types of computing devices may be used, such as, for example, the computing device shown in FIG. 7 and described below. The physical resources 104 may include any number and/or type of such computing devices in any arrangement and/or configuration.

The storage and/or memory of a computing device or system of computing devices, or any other component of the physical resources 104, may be and/or include one or more data repositories for storing any number of data structures storing any amount of data (e.g., information). A data repository may be any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

Any storage and/or memory of a computing device, system of computing devices, or any other component of the physical resources 104 may be considered, in whole or in part, as non-transitory computer readable mediums storing software and/or firmware.

Such software and/or firmware may include instructions which, when executed by the one or more processors (not shown) and/or other hardware (e.g., circuitry) of a computing device and/or system of computing devices, cause the one or more processors and/or other hardware components to perform.

The software instructions may be in the form of computer readable program code to perform methods, processes, etc., and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

The physical resources 104 may include any number of computing devices, any number of which may be collectively considered a computing device as used herein. All or any portion of the computing devices may be the same type or be different types of computing devices.

The cloud resources 102 include the logical resources 106. As used herein, the logical resources 106 include any software, firmware, applications, container platforms, virtualization environments, microservices, communication protocols, storage buckets, etc. that execute, at least in part, using the physical resources 104.

As an example, all or any portion of the logical resources 106 may be managed, at least in part, by a container platform (not shown), such as, for example, Kubernetes. A container platform may include a control plane (not shown). A control plane of a container platform may include various components for managing the logical resources (e.g., one or more API servers, controllers, schedulers, etc.). The control plane may, for example, be implemented on one or more nodes, each of which may be a computing device (discussed above).

The cloud resources 102 may host any number of cloud-based applications as part of the logical resources 106, which may be implemented using a microservice architecture that includes any number of application microservices, as well as various other microservices (e.g., a user interface microservice, any number of common microservices, etc.) and various communication components that allow the various microservices to interact with other microservices, other parts of the cloud resources 102, the cloud infrastructure 100, and/or entities and/or devices outside the cloud infrastructure 100.

A microservice may be implemented using any number of containers, container pods, etc. Each microservice may implement a particular service component that makes up part of an overall cloud-based application deployed as at least a portion of the logical resources 106.

The logical resources 106 may include common microservices, which may be a set of services that are common to all or any portion of the other microservices of the one or more cloud-based applications deployed using a microservice architecture in the cloud infrastructure 100. Examples of common microservices include, but are not limited to, database services, authorization services, workflow orchestration microservices, auditing microservices, management microservices, etc.

The logical resources 106 include various communication components. As used herein, communication components include logical devices and/or components that implement any number of communication protocols that allow communication within the cloud resources 102. As an example, various communication protocols may include, but are not limited to, Representational State Transfer (REST) protocol, remote procedure call (RPC) frameworks (e.g., gRPC), Kafka protocol, etc., as well as other underlying protocols that may be used in communications, such as hypertext transfer protocol (HTTP), transmission control protocol (TCP), user datagram protocol (UDP), etc. Such protocols may be used for communicating data, commands, etc. Communication components of the logical resources 106 may, for example, be implemented, at least in part, using network devices of the physical resources 104.

The logical resources 106 may include any number (e.g., hundreds, thousands, millions) of buckets (e.g., Amazon S3 buckets). A bucket may be a cloud storage container for storing information of any type or amount. The logical resources 106 may include any other types of logical entities (e.g., virtual machines, virtual network devices, virtual storage devices, hypervisors, management software, etc.).

Although not shown in FIG. 1, each of the physical resources 104 and/or logical resources 106 of the cloud resources 102 in the cloud infrastructure 100 may correspond to a data object (which may be stored anywhere in the cloud infrastructure 100) that includes information about the resource.

As an example, a blade server enclosure may have a firmware version, a certain number of components installed that are each in certain state (e.g., on, off, connected to or disconnected from a network, in a degraded state, functioning normally, etc.), any other relevant information related to the enclosure, etc., and the collection of such information about the enclosure may be considered an object. As another example, a cloud-based application may be deployed in a Kubernetes container platform as a set of microservices implemented on a number of container pods, each having any number of containers, and all of the information about that application, or any portion thereof (e.g., the container platform, the microservices, pods, containers, devices on which such things are deployed, etc.), may be considered an object. As another example, a user may have created any number of buckets (e.g., Amazon S3 buckets) for storing information of any type, and information about each of the buckets (e.g., bucket size, space left in bucket, access policy for bucket, etc.) may be considered as objects. Thus, as used herein, an object may refer to metadata about a resource (e.g., an enclosure, a container deployment, a bucket, any physical or logical component, etc.) in the cloud resources 102.

Objects may be grouped into resource types. For example, an enclosure resource type may refer to all objects corresponding to enclosures, a container resource type may refer to a collection of objects corresponding to container deployments, a bucket resource type may refer to a collection of objects corresponding to buckets, etc.

The cloud infrastructure 100 includes the cloud information service 108. The cloud information service may be any hardware, software, firmware, or any combination thereof that is configured to maintain information about objects (discussed above) corresponding to any of the physical resources 104 and/or logical resources 106 of the cloud resources 102 of the cloud infrastructure 100, and to provide such information to any number of user interfaces (e.g., the user interface 112, discussed below). As an example, the cloud information service 108 may include any number of computing devices (discussed above). As another example, the cloud information service may be implemented as part of a cloud management service executing in a cluster pod of a cluster maintained by an entity managing, at least in part, the cloud infrastructure 100.

A cloud information service may be configured to create and maintain a cache ring 114 for each resource type in a cloud infrastructure. There may be any number of cache rings, depending on how many resource types exist in the cloud infrastructure. The cache rings 114 are used to maintain a versioned history of updates to objects corresponding to the physical resources 104 and/or logical resources 106 of the cloud resources 102, and to provide information about the objects to any number of user interfaces. The cache rings maintained by the cloud information service, and the operations of the cloud information service related to maintain the cache rings and providing information to user interfaces is discussed further in the descriptions of FIG. 2, FIG. 3, FIG. 4, FIG. 5, and FIG. 6, below.

Although FIG. 1 shows the cloud information service 108 as part of the same cloud infrastructure 100 as the cloud resources 102, the cloud information service 108 may alternately be deployed in a separate cloud infrastructure and operatively connected to the cloud infrastructure 100. Additionally, although FIG. 1 shows a single cloud information service 108, the system may include any number of cloud information services.

The system includes any number of users (e.g., the user 110). The user 110 may be any entity (e.g., a human, a software application, etc.) that seeks to access information about any of the cloud resources 102 of the cloud infrastructure 100. Information about any of the cloud resources 102 of the cloud infrastructure 100 may be obtained by the user 110 via one or more user interfaces (e.g., the user interface 112). The user interface 112 may be any hardware, software, firmware, or any combination thereof that is configured to allow the user 110 to view or otherwise obtain information about all or any portion of the cloud resources 102 of the cloud infrastructure 100. The user interface, at least some of the time, is operatively connected to the cloud information service 108. A given user (e.g., the user 110) may access the user interface 112 (e.g., a Data Services Cloud Console) in which the user 110 may view information about the various resources (e.g., the aforementioned physical resources 104 and/or logical resources 106) that exist in the cloud infrastructure 100. Any number of users using any number of user interfaces may exist that desire to see information about resources in a particular cloud infrastructure.

When the user 110 initiates (e.g., opens, executes, connects to, etc.) the user interface 112 for viewing information about resources in the cloud infrastructure 100 for the first time, a subscription request may be sent to the cloud information service 108 that is operatively connected to the cloud resources 102 in which the physical resources 104 and the logical resources 106 exist. Such subscription requests may also occur each time the user interface 112 reconnects to the cloud information service 108 (e.g., after a disconnect). The user interface 112 may remain subscribed after a subscription request as long as the user interface 112 remains connected to the cloud information service 108. In response to the subscription request, the cloud information service 108 may access information about the cloud resources 102, and provide the information to the user interface 112 in response to the subscription request, and provide updates for as long as the user interface 112 maintains the connection, and, thus, remains subscribed.

While FIG. 1 shows a particular configuration of components, other configurations may be used. For example, although FIG. 1 shows certain components as part of the same device, component, and/or infrastructure, any of the components may be grouped in sets of one or more components which may exist and execute as part of any number of separate and operatively connected devices. As another example, a single component may be configured to perform all, or any portion of the functionality performed by the all or any portion of the components shown in FIG. 1. Accordingly, aspects disclosed herein should not be limited to the configuration of components shown in FIG. 1.

FIG. 2 illustrates an example cache ring 200 (e.g., cache ring 114 of FIG. 1) for maintaining a versioned history of updates to objects corresponding to the cloud resources 102 (e.g., the physical resources 104, the logical resources 106) and providing information about the objects to any number of user interfaces (e.g., the user interface 112). The cache ring 200 may include entries of an initial full refresh 202 corresponding to an initial subscription request from a user (e.g., the user 110). The cloud information service 108 creates a list of all objects of the resource type to which the cache ring 200 corresponds. The list of objects corresponds to a resource/resources currently present in the cloud infrastructure. The cloud information service 108 adds entries (e.g., entries 204, 206, 208, 210) to the cache ring 200 corresponding to the list of all objects of the initial full refresh 202, and the entries occupy the cache ring 200 from a start index to an end index. Each entry added to the cache ring 200 may include a unique identifier (ID) (e.g., a unique name, a universally unique identifier (UUID), etc.) of the object that was updated, and a version data item. The version data item may include an encoding of the type of entry, as well as a representation of the version number for the entry. As an example, the version data item may be a thirty-two-bit number, in which the first two bits are used to encode one of the four entry types (e.g., refresh, update, delete, create) and the remaining thirty bits are used to encode the integer value of the version number. In FIG. 2, each entry added to the cache ring 200 corresponds to a respective index that is increased from the previous entry (e.g., by one). For example, the first object on the list (e.g., ID=0) may occupy the entry 204 on the cache ring 200 with the start index=0, the second object on the list (e.g., ID=1) may occupy the entry 206, the third object on the list (e.g., ID=2) may occupy the entry 208, while the last object on the list may occupy the entry 210 with the end index=3. The entries 204, 206, 208, and 210 are refresh entries since they are entries of the initial full refresh 202. When an update occurs to any objects (e.g., the object 2 with ID=2), the cloud information service 108 adds a corresponding entry to the cache ring 200 (e.g., at the next available location after the end index). For example, when the object 2 with ID=2 is deleted, the cloud information service 108 adds a delete entry 212 to the cache ring 200, and when the object 3 with ID=3 is updated, the cloud information service 108 adds an update entry 214 to the cache ring 200. For example, a new object (e.g., ID=4) may be created, and a create entry 216 may be added to the cache ring 200.

Figure 5:
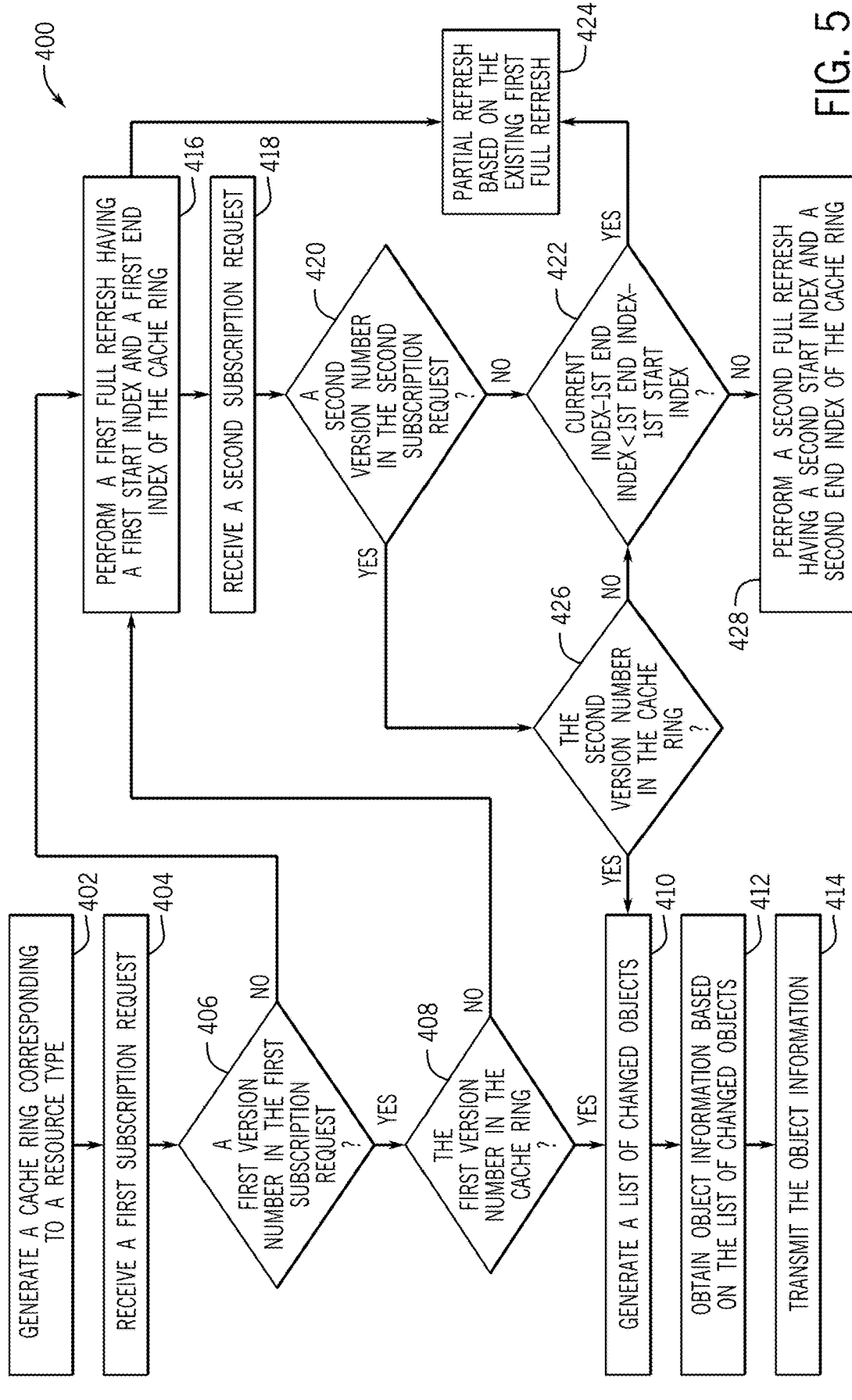
FIG. 5 illustrates an overview of an example method for providing information about cloud resources to user interfaces, in accordance with aspects of the present disclosure.
Figure 6:
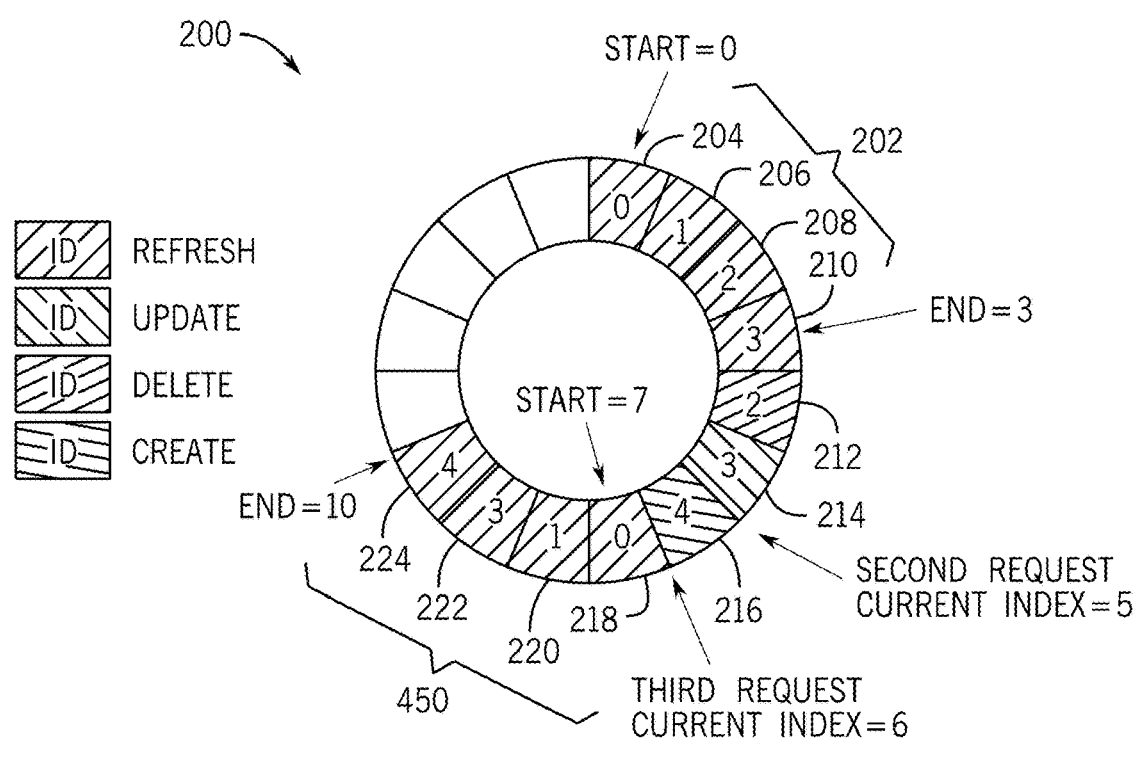
FIG. 6 illustrates entries of additional list of objects of a subsequent full refresh added to the example cache ring of FIG. 2, in accordance with aspects of the present disclosure.

When a subsequent subscription request is received, the cloud information service 108 may determine whether another full refresh may be performed based on a condition. For example, a second subscription request may be received after the entry 214, which has an index of 5; and a third subscription request may be received after the entry 216, which has an index of 6. The cloud information service 108 may determine whether a full refresh needs to be performed for the subsequent subscription requests (e.g., the second subscription request, the third subscription request) based on a relationship among the current index on the cache ring 200, when the corresponding subscription request is received (e.g., the current index is 5 for the second subscription request, the current index is 6 for the third subscription request) and the start index and the end index of the last full refresh (e.g., the initial full refresh 202). For example, when the relationship indicates that there has been significant change to the underlying object set since the last refresh, a full refresh may need to be performed for the subsequent subscription requests, as illustrated in FIG. 6. When the condition is not satisfied, the cloud information service 108 may perform a partial refresh based on the initial full refresh 202, as illustrated in FIG. 3, FIG. 4, and FIG. 5. With this approach, the initial size of the circular arrays may be reduced, and the system may support increased number of consumers and increased disconnection time.

The following description, for the sake of clarity, will focus on one cache ring for one resource type. However, one of ordinary skill in the art will appreciate that the description of a cache ring applies to any number of cache rings for any number of resource types in a cloud infrastructure, and that a cloud information service may use the various cache rings to provide information to a user interface about any number of resource types. All or any portion of the methods shown in FIGS. 3 to 5 may be performed, for example, by a cloud information service (e.g., the cloud information service 108 shown in FIG. 1 and described above). While the various steps in the flowchart shown in FIGS. 3-5 are presented and described sequentially, some or all of the steps may be executed in different orders, some or all of the steps may be combined or omitted, other steps not shown in FIGS. 3-5 may additionally be performed, and/or some or all of the steps may be executed in parallel with other steps of FIGS. 3-5.

FIG. 3 is a simplified overview of an example method 250 for performing a partial refresh instead of a full refresh for a subscription request when a current index of a cache ring (e.g., the cache ring 200) satisfies a condition. At block 252, a cache ring (e.g., the cache ring 200) may be generated by a cloud information service (e.g., the cloud information service 108 of FIG. 1). The cloud information service may be configured to create and maintain a cache ring for each resource type in a cloud infrastructure. The cache ring may be implemented in memory (e.g., rather than some form of persistent storage). The cache ring may initially have no entries. The cache ring may have entries that are added by the cloud information service as they are received by the cloud information service.

At block 254, the cloud information service may receive a first subscription request from a first user interface and perform a first full refresh (e.g., the initial full refresh 202). For example, the first subscription request may include an electronic request indicating a particular resource that the first user interface would like to receive status updates for. For example, a first full refresh may be performed for an initial subscription request. The cloud information service may create a first list of objects of the resource type to which the cache ring corresponds. The first list of objects corresponds to the particular resource currently present in the cloud infrastructure 100. The cloud information service adds entries (e.g., entries 204, 206, 208, 210) to the cache ring corresponding to the first list of objects of the first full refresh. The cloud information service may obtain the object information for the first list of objects and send the object information to the first user interface. The user interface may update the information for the user using the object information received from the cloud information service.

At block 256, the cloud information service may receive a second subscription request with or without a version number. The second subscription request may be received from a second user using a second user interface, or, from the same user interface as the first subscription request (e.g., when the first user interface disconnects and later resumes).

At block 258, if the cache ring does not include the version number of the second subscription request, or, if the second subscription request does not include a version number, the cloud information service may determine whether a current index (e.g., current index=5 for the second subscription request in FIG. 2) of the cache ring satisfies a condition. If the current index of the cache ring satisfies the condition, the cloud information service may perform a partial refresh based on the last full refresh (e.g., the first full refresh). The condition may be predetermined for various purposes. The condition may be used to prevent duplicating refresh entries for the same objects unless there has been significant change to the underlying object set since the last full refresh, as illustrated in FIG. 4.

FIG. 4 illustrates an example method 300 for performing a partial refresh instead of a full refresh for a subscription request when a current index of a cache ring (e.g., the cache ring 200) satisfies a condition. At block 302, the cloud information service (e.g., the cloud information service 108) may receive a first subscription request from a first user interface and perform a first full refresh (e.g., the initial full refresh 202). The cloud information service may create a first list of objects of the resource type to which the cache ring corresponds. The first list of objects corresponds to a resource currently present in the cloud infrastructure 100. The cloud information service adds entries (e.g., entries 204, 206, 208, 210) to the cache ring corresponding to the first list of objects of the first full refresh, and the entries occupy the cache ring from a first start index to a first end index. At block 304, the cloud information service may receive a second subscription request (e.g., the second subscription request received at index=5 in FIG. 2). The second subscription request may be received from a second user using a second user interface, or, from the same user interface as the first subscription request (e.g., when the first user interface disconnects and later resumes).

At block 306, the cloud information service may determine whether the second subscription request includes a version number. For instance, if a user has previously connected to the cloud information service, a subscription request received as part of a reconnect may include the version number that was the highest version number present in the cache ring the last time the user was connected.

If the second subscription request does not include a version number (or, if the second subscription request include a version number that is not currently in the cache ring, as illustrated in FIG. 5), at block 308, the cloud information service may determine whether the current index satisfies a condition. For example, the cloud information service may condition partial refreshes as opposed to full refreshes based upon a comparison of lengths of entries of the last full refresh (e.g., the initial full refresh 202) and a length of update entries with respect to the last full refresh. For example, when the length of the update entries is greater than or equal to the number of entries in the last full refresh, this condition may trigger a full refresh. In other words, if the number of update entries is less than the number of entries of the previous full refresh, this may trigger a partial refresh in lieu of a full refresh.

To implement such conditioning, the cloud information service may compare the difference between the current index (e.g., index=5) and the end index (e.g., end index=3) of the last full refresh (e.g., the first full refresh) with the difference between the end index and the start index (e.g., start index=0) of the last full refresh. If the difference between the current index and the end index (e.g., index-end index=2) of the last full refresh is less than the difference between the end index and the start index (e.g., end index-start index=3) of the last full refresh, the cloud information service may perform a partial refresh using the existing entries on the cache ring for the last full refresh (e.g., the first full refresh) at block 310. In FIG. 4, during the partial refresh, the cloud information service may utilize the existing entries in the first full refresh (e.g., entries 204, 206, 208, 210) together with the updates added to the cache ring after the last entry of the first full refresh (e.g., entries 212, 214) to create a list of objects that may be sent to the user interface corresponding to the second subscription request. The cloud information service creates the list of objects to reflect the change to whatever the new version number of the objects that were updated so that the newest versions of the objects are always sent to the user interface. For example, as illustrated in FIG. 2, when the object 2 with ID=2 is deleted, the cloud information service adds a delete entry 212 to the cache ring 200, and when the object 3 with ID=3 is updated, the cloud information service adds an update entry 214 to the cache ring 200. The cloud information service may include the new version number of the object 3 (e.g., the entry 214 instead of the entry 210) in the list of objects. The cloud information service may not include the object 2 in the list of objects since it is deleted at the entry 212. During the partial refresh, the cloud information service does not add entries to the cache ring corresponding to the list of objects. Accordingly, the cloud information service does not fill the cache ring with multiple sets of entries representing the same underlying objects. The cloud information service may obtain the object information for the list of objects and send the object information to the user interface. The user interface may update the information for the user using the object information received from the cloud information service.

If the current index does not satisfy the condition at block 308, the cloud information service may perform a second full refresh at block 312. The cloud information service may create a second list of objects of the resource type to which the cache ring corresponds. The second list of objects corresponds to a resource currently present in the cloud infrastructure 100. The cloud information service adds entries to the cache ring corresponding to the second list of objects of the second full refresh, and the entries occupy the cache ring from a second start index to a second end index.

FIG. 5 illustrates an overview of an example method 400 for providing information about cloud resources to user interfaces. At block 402, a cache ring (e.g., the cache ring 200) may be generated by a cloud information service (e.g., the cloud information service 108 of FIG. 1). The cloud information service may be configured to create and maintain a cache ring for each resource type in a cloud infrastructure. The cache ring may be implemented in memory (e.g., rather than some form of persistent storage). The cache ring may initially have no entries. The cache ring may have entries that are added by the cloud information service as they are received by the cloud information service.

At block 404, the cloud information service may receive a first subscription request from a first user interface. A subscription request is received whenever the user interface is accessed by the user so that the user may view information about resources of a cloud infrastructure (e.g., the cloud infrastructure 100). As such, a subscription request may be received when a user first uses the user interface and connects to a cloud information service, and also each time a user reconnects to the cloud information service after previously disconnecting from the cloud information service.

At block 406, the cloud information service may determine whether the first subscription request includes a first version number. An initial subscription request may, in some cases, not include a version number. Subscription requests received from a user interface that has previously connected to the cloud information service may generally include the highest version number in a cache ring that existed at the last time the user interface was connected. For instance, a user interface may disconnect from the cloud information service for any reason. As an example, the disconnect may be intentional (e.g., the user closes the user interface) or may result from a disruption of the connection between the user interface and the cloud information service (e.g., a network outage). If a user has previously connected to the cloud information service, a subscription request received as part of a reconnect may include the version number that was the highest version number present in the cache ring the last time the user was connected.

If the first subscription request includes the first version number, the cloud information service may determine whether the first version number is a version number in an entry that is presently in the cache ring at block 408. For example, the cloud information service may perform a binary search to determine whether the first version number received in the first subscription request is still in the cache ring. The fact that the version numbers of entries added to the cache ring by the cloud information service always increases allows the cloud information service to perform the binary search.

If the first version number in the first subscription request is found in the cache ring, at block 410, the cloud information service may generate a list of changed objects based on entries starting with the next version number after the first version number except for the refresh entries that may be in the cache ring for a full refresh being performed for another user (which are skipped by the cloud information service). For example, if a disconnect occurs during a full refresh, when the user interface reconnects, and a new subscription request is received, the new subscription request may include a version number which is the newest version number that the user interface received during the attempted full refresh. In this case, the cloud information service may resume the full refresh by starting with the next version number after the version number received in the new subscription request, and the list of changed objects may include all four types (e.g., update, create, delete, refresh) of entries. If a disconnect occurs after a full refresh was completed, then the version number may be the highest version number received as part of the full refresh, or of any updates received after the full refresh while the user remained connected to the cloud information service. In this case, the list of changed objects may include entries of update, create, and delete entry types. The cloud information service may use the unique identifiers (which are included in the entries in the cache ring) of the objects to obtain the information from the objects using whatever method of obtaining such information is appropriate for the resource type (e.g., Kubernetes API for objects corresponding to a container deployment, other APIs for objects corresponding to physical resources, etc.).

At block 414, the cloud information service may transmit the object information obtained at block 412 to the user interface using any technique for transmitting information (e.g., as messages in data packets over a network). The object information may include information for any objects corresponding to an update entry type or a create entry type in the cache ring, notifications of object deletions corresponding to entries in the cache ring with a deleted entry type, or information for all entries (e.g., update, create, delete, refresh) in the cache ring having a higher version number than the first version number.

If the cloud information service determines that the first subscription request does not include the first version number at block 406 or the first version number is not in the cache ring at decision block 408, the cloud information service may perform a first full refresh at block 416. The cloud information service may create a first list of objects of the resource type to which the cache ring corresponds. The first list of objects corresponds to a resource currently present in the cloud infrastructure. The cloud information service adds entries (e.g., entries 204, 206, 208, 210 of FIG. 1) to the cache ring corresponding to the first list of objects of the first full refresh, and the entries occupy the cache ring from a first start index to a first end index.

At block 418, the cloud information service may receive a second subscription request (e.g., the second subscription request received at index=5 in FIG. 2). The second subscription request may be received from a second user using a second user interface, or, from the same user interface as the first subscription request (e.g., when the first user interface disconnects and later resumes).

At block 420, the cloud information service may determine whether the second subscription request includes a second version number. If the second subscription request does not include a second version number, at block 422, the cloud information service may determine whether the current index satisfies a condition, such as the entry length comparison condition described above with respect to decision block 308 of FIG. 4. For example, the cloud information service may compare the difference between the current index (e.g., index=5) and the end index (e.g., end index=3) of the last full refresh (e.g., the first full refresh) with the difference between the end index and the start index (e.g., start index=0) of the last full refresh (e.g., the first full refresh). If the difference between the current index and the end index (e.g., index-end index=2) of the last full refresh is less than the difference between the end index and the start index (e.g., end index-start index=3) of the last full refresh, the cloud information service may perform a partial refresh using the existing entries on the cache ring for the last full refresh (e.g., the first full refresh) at block 424. In FIG. 5, during the partial refresh, the cloud information service may utilize the existing entries in the first full refresh (e.g., entries 204, 206, 208, 210) together with the updates added to the cache ring after the last entry of the first full refresh (e.g., entries 212, 214) to create a list of objects that may be sent to the user interface corresponding to the second subscription request. The cloud information service creates the list of objects to reflect the change to whatever the new version number of the objects that were updated so that the newest versions of the objects are always sent to the user interface. For example, as illustrated in FIG. 2, when the object 2 with ID=2 is deleted, the cloud information service adds a delete entry 212 to the cache ring 200, and when the object 3 with ID=3 is updated, the cloud information service adds an update entry 214 to the cache ring 200. The cloud information service may include the new version number of the object 3 (e.g., the entry 214 instead of the entry 210) in the list of objects. The cloud information service may not include the object 2 in the list of objects since it is deleted at the entry 212. During the partial refresh, the cloud information service does not add entries to the cache ring corresponding to the list of objects. Accordingly, the cloud information service does not fill the cache ring with multiple sets of entries representing the same underlying objects. The cloud information service may obtain the object information for the list of objects and send the object information to the user interface. The user interface may update the information for the user using the object information received from the cloud information service.

If the current index does not satisfy the condition at block 422, the cloud information service may perform a second full refresh at block 428. The cloud information service may create a second list of objects of the resource type to which the cache ring corresponds. The second list of objects corresponds to a resource currently present in the cloud infrastructure. The cloud information service adds entries to the cache ring corresponding to the second list of objects of the second full refresh, and the entries occupy the cache ring from a second start index to a second end index, as illustrated in FIG. 6.

FIG. 6 illustrates entries of additional list of objects of a subsequent full refresh (e.g., corresponding to the third request of FIG. 2) may be added to the example cache ring 200. For example, When the third request (e.g., index=6) is received from a user interface, the cloud information service may compare the difference between the current index (e.g., index=6) and the end index (e.g., end index=3) of the most recent full refresh (e.g., the initial full refresh 202) with the difference between the end index and the start index (e.g., start index=0) of the most recent full refresh (e.g., the initial full refresh 202). In FIG. 6, if the difference between the current index of the third request and the end index (e.g., index-end index=3) of the initial full refresh 202 is equal to or more than the difference between the end index and the start index (e.g., end index-start index=3) of the initial full refresh 202, the cloud information service may perform a subsequent full refresh 450. The cloud information service may create additional list of objects of the resource type to which the cache ring corresponds. The additional list of objects corresponds to a resource currently present in the cloud infrastructure. The cloud information service creates the additional list of objects to reflect the change to whatever the new version number of the objects that were updated so that the newest versions of the objects are always sent to the user interface. Accordingly, the additional list of objects may not include object 2 since it has been deleted, and the additional list of objects may include the updated object 3 and the newly created object 4. The cloud information service may add entries (e.g., entries 218, 220, 222, and 224) to the cache ring corresponding to the additional list of objects of the subsequent full refresh 450, and the entries occupy the cache ring from a start index (e.g., index 218) to an end index (e.g., index 224). The cloud information service may obtain the object information for the additional list of objects and send the object information to the user interface. The user interface may update the information for the user using the object information received from the cloud information service.

Back to FIG. 5, at block 420, if the cloud information service determines that the second subscription request includes a second version number, the cloud information service may determine whether the second version number is a version number in an entry that is presently in the cache ring at block 426. If the second version number in the second subscription request is found in the cache ring, the cloud information service may perform operations included in blocks 410 to 414. If the second version number in the second subscription request is not found in the cache ring, the cloud information service may proceed to perform the operation in block 422.

The method 400 may continuously repeat until the cache ring for the corresponding resource is no longer used. For example, the method 400 may continue as long as there are subscribers to the corresponding resource type, as updates to the corresponding resource type may still be provided to the subscribing user interfaces.

Figure 7:
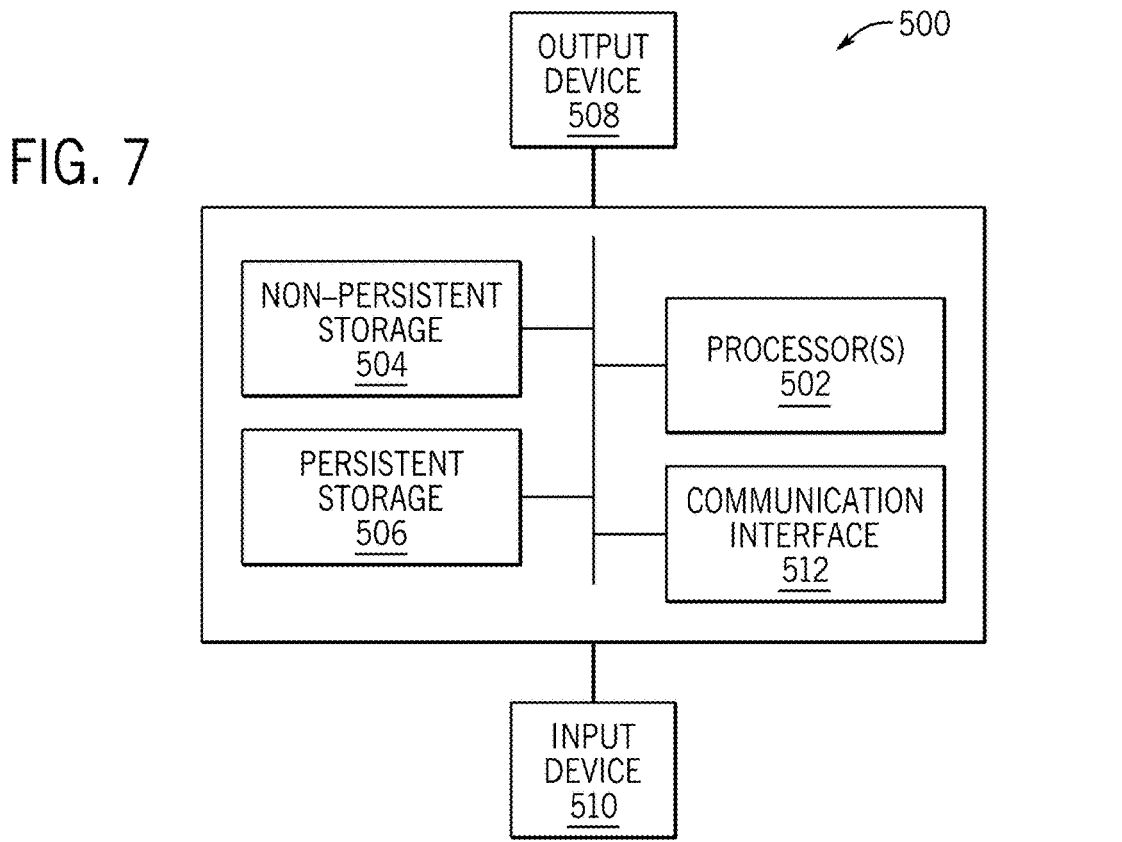
FIG. 7 illustrates a block diagram of a computing device, in accordance with aspects of the present disclosure.

FIG. 7 illustrates a block diagram of a computing device. As discussed above, aspects described herein may be implemented using computing devices. For example, the all or any portion of the components shown in FIG. 1 may be implemented, at least in part, using one or more computing devices, and all or any portion of the method shown in FIG. 2, FIG. 3, FIG. 4, FIG. 5, and FIG. 6 may be performed using one or more computing devices, such as the computing device 500. The computing device 500 may include one or more computer processors 502, non-persistent storage 504 (e.g., volatile memory, such as random access memory (RAM), cache memory, etc.), persistent storage 506 (e.g., a hard disk, an optical drive such as a compact disk (CD) drive or digital versatile disk (DVD) drive, a flash memory, etc.), a communication interface 512 (e.g., Bluetooth interface, infrared interface, network interface, optical interface, etc.), input devices 510, output devices 508, and numerous other elements (not shown) and functionalities. Each of these components is described below.

The computer processor(s) 502 may be an integrated circuit for processing instructions. For example, the computer processor(s) may be one or more cores or micro-cores of a processor. The processor 502 may be a general-purpose processor configured to execute program code included in software executing on the computing device 500. The processor 502 may be a special purpose processor where certain instructions are incorporated into the processor design. The processor 502 may be an application specific integrated circuit (ASIC), a graphics processing unit (GPU), a data processing unit (DPU), a tensor processing units (TPU), an associative processing unit (APU), a vision processing units (VPU), a quantum processing units (QPU), and/or various other processing units that use special purpose hardware (e.g., field programmable gate arrays (FPGAs), System-on-a-Chips (SOCs), digital signal processors (DSPs), etc.), etc. Although only one processor 502 is shown in FIG. 7, the computing device 500 may include any number of processors.

The computing device 500 may also include one or more input devices 510, such as a touchscreen, keyboard, mouse, microphone, touchpad, electronic pen, motion sensor, or any other type of input device. The input devices 510 may allow a user to interact with the computing device 500. The computing device 500 may include one or more output devices 508, such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) 502, non-persistent storage 504, and persistent storage 506. Many different types of computing devices exist, and the aforementioned input and output device(s) may take other forms. In some instances, multimodal systems can allow a user to provide multiple types of input/output to communicate with the computing device 500.

Further, the communication interface 512 may facilitate connecting the computing device 500 to a network (not shown) (e.g., a local area network (LAN), a wide area network (WAN) such as the Internet, mobile network, or any other type of network) and/or to another device, such as another computing device. The communication interface 512 may perform or facilitate receipt and/or transmission of wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a Bluetooth® wireless signal transfer, a BLE wireless signal transfer, an IBEACON® wireless signal transfer, an RFID wireless signal transfer, near-field communications (NFC) wireless signal transfer, dedicated short range communication (DSRC) wireless signal transfer, 802.11 WiFi wireless signal transfer, WLAN signal transfer, Visible Light Communication (VLC), Worldwide Interoperability for Microwave Access (WiMAX), IR communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 512 may also include one or more Global Navigation Satellite System (GNSS) receivers or transceivers that are used to determine a location of the computing device 500 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

The term computer-readable medium includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as CD or DVD, flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

All or any portion of the components of the computing device 500 may be implemented in circuitry. For example, the components can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

While certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. An apparatus, comprising:
one or more processors; and
one or more non-transitory computer readable media storing instructions which, when executed by the one or more processors, cause the one or more processors to:
generate a cache ring for a resource type, wherein the cache ring comprises a plurality of entries corresponding to objects associated with a resource of the resource type in a cloud infrastructure, wherein the plurality of entries corresponds to a plurality of version numbers, and wherein the plurality of entries comprises a first set of entries corresponding to a first full refresh having a first start index and a first end index of the cache ring;

receive, from a user interface, a subscription request that either lacks a version number or provides the version number that is not included in the plurality of version numbers; and in response to the subscription request, when a current index of the cache ring satisfies a partial refresh condition, fails to meet a full refresh condition, or both, perform a partial refresh based on the first full refresh.

2. The apparatus of claim 1, wherein the first full refresh is the only full refresh performed between the first start index and the current index.

3. The apparatus of claim 1, wherein the partial refresh uses at least one entry of the first set of entries.

4. The apparatus of claim 1, wherein the execution of the instructions further causes the one or more processors to:

in response to the subscription request, when the current index of the cache ring fails to meet the partial refresh condition, satisfies the full refresh condition, or both, perform a second full refresh having a second start index and a second end index of the cache ring.

5. The apparatus of claim 1, wherein the partial refresh condition comprises a comparison between a first number of entries between the current index and the first end index and a second number of entries between the first end index and the first start index.

6. The apparatus of claim 5, wherein the execution of the instructions further causes the one or more processors to:

in response to the subscription request, when the current index of the cache ring fails to meet the partial refresh condition, perform a second full refresh.

7. The apparatus of claim 1, wherein each of the plurality of entries in the cache ring has a respective entry type comprising one of: an update entry type, a delete entry type, a create entry type, or a refresh entry type.

8. A computer-implemented method, comprising:

generating a cache ring for a resource type, wherein the cache ring comprises a plurality of entries corresponding to objects associated with resources of the resource type in a cloud infrastructure, wherein the plurality of entries corresponds to a plurality of version numbers, and wherein the plurality of entries comprises a first set of entries corresponding to a first full refresh having a first start index and a first end index of the cache ring;

receiving, from a user interface, a subscription request that either lacks a version number or provides the version number that is not included in the plurality of version numbers; and in response to the subscription request, when a current index of the cache ring satisfies a partial refresh condition, fails to meet a full refresh condition, or both, performing a partial refresh based on the first full refresh.

9. The computer-implemented method of claim 8, wherein the first full refresh is the only full refresh performed between the first start index and the current index.

10. The computer-implemented method of claim 8, wherein the partial refresh uses at least one entry of the first set of entries.

11. The computer-implemented method of claim 8, comprising:

in response to the subscription request, when the current index of the cache ring fails to meet the partial refresh condition, satisfies the full refresh condition, or both, performing a second full refresh having a second start index and a second end index of the cache ring.

12. The computer-implemented method of claim 8, wherein the partial refresh condition comprises a comparison between a first number of entries between the current index and the first end index and a second number of entries between the first end index and the first start index.

13. The computer-implemented method of claim 12, comprising:

in response to the subscription request, when the current index of the cache ring fails to meet the partial refresh condition, performing a second full refresh.

14. The computer-implemented method of claim 8, wherein each of the plurality of entries in the cache ring has a respective entry type comprising one of an update entry type, a delete entry type, a create entry type, or a refresh entry type.

15. A tangible, non-transitory, and machine-readable medium comprising instructions that, when executed by processing circuitry, cause the processing circuitry to perform operations comprising:

generating a cache ring for a resource type, wherein the cache ring comprises a plurality of entries corresponding to objects associated with resources of the resource type in a cloud infrastructure, wherein the plurality of entries corresponds to a plurality of version numbers, and wherein the plurality of entries comprises a first set of entries corresponding to a first full refresh having a first start index and a first end index of the cache ring;

receiving, from a user interface, a subscription request that either lacks a version number or provides the version number that is not included in the plurality of version numbers; and in response to the subscription request, when a current index of the cache ring satisfies a partial refresh condition, fails to meet a full refresh condition, or both, performing a partial refresh based on the first full refresh.

16. The tangible, non-transitory, and machine-readable medium of claim 15, wherein the partial refresh uses at least one entry of the first set of entries.

17. The tangible, non-transitory, and machine-readable medium of claim 15, wherein the operations comprise:

in response to the subscription request, when the current index of the cache ring fails to meet the partial refresh condition, satisfies the full refresh condition, or both, performing a second full refresh having a second start index and a second end index of the cache ring.

18. The tangible, non-transitory, and machine-readable medium of claim 15, wherein the partial refresh condition comprises a comparison between a first number of entries between the current index and the first end index and a second number of entries between the first end index and the first start index.

19. The tangible, non-transitory, and machine-readable medium of claim 18, wherein the operations comprise:

in response to the subscription request, when the current index of the cache ring fails to meet the partial refresh condition, perform a second full refresh.

20. The tangible, non-transitory, and machine-readable medium of claim 15, wherein each of the plurality of entries in the cache ring has a respective entry type of one of an update entry type, a delete entry type, a create entry type, and a refresh entry type.

* * * * *